United States Patent
Lu et al.

(10) Patent No.: US 11,673,808 B2
(45) Date of Patent: Jun. 13, 2023

(54) LOW-VISCOSITY GRAPHENE OXIDE SLURRY AND PREPARATION METHOD THEREOF, AND GRAPHENE OXIDE FILM AND PREPARATION METHOD THEREOF

(71) Applicant: CHANGZHOU FUXI TECHNOLOGY CO., LTD, Jiangsu (CN)

(72) Inventors: Jing Lu, Jiangsu (CN); Bucun Zhou, Jiangsu (CN); Renjie Zhou, Jiangsu (CN); Feng Li, Jiangsu (CN)

(73) Assignee: CHANGZHOU FUXI TECHNOLOGY CO., LTD, Jiangsu (CN)

( * ) Notice: Subject to any disclaimer, the term of this patent is extended or adjusted under 35 U.S.C. 154(b) by 0 days.

(21) Appl. No.: 17/753,172

(22) PCT Filed: Aug. 17, 2020

(86) PCT No.: PCT/CN2020/109442
§ 371 (c)(1),
(2) Date: Feb. 22, 2022

(87) PCT Pub. No.: WO2021/032039
PCT Pub. Date: Feb. 25, 2021

(65) Prior Publication Data
US 2022/0267156 A1    Aug. 25, 2022

(30) Foreign Application Priority Data
Aug. 22, 2019   (CN) .......................... 201910778811.7

(51) Int. Cl.
*C01B 32/198*   (2017.01)
*C01B 32/184*   (2017.01)

(52) U.S. Cl.
CPC .......... *C01B 32/198* (2017.08); *C01B 32/184* (2017.08); *C01P 2004/61* (2013.01); *C01P 2006/10* (2013.01)

(58) Field of Classification Search
CPC ... C01B 32/198; C01B 32/184; C01B 32/182; C01B 32/186; C01B 32/188;
(Continued)

(56) References Cited

U.S. PATENT DOCUMENTS 9,156,700 B2   10/2015   Zhamu et al.
2018/0312404 A1*  11/2018   Karagiannidis ......... C01B 32/19
(Continued)

FOREIGN PATENT DOCUMENTS

CN   102382312 A   3/2012
CN   103283934 A   9/2013
(Continued)

OTHER PUBLICATIONS

Guerrero-Contreras, et al., Graphene oxide powders with different oxidation degree, prepared by synthesis variations of the Hummers method, Materials Chemistry and Physics 2015; 153: 209-220 (Year: 2015).*

*Primary Examiner* — Daniel C. McCracken
(74) *Attorney, Agent, or Firm* — Novick, Kim & Lee, PLLC; Allen Xue

(57) ABSTRACT

Provided are a low-viscosity graphene oxide slurry and a preparation method thereof, a graphene oxide film and a preparation method thereof, and a graphene heat-conducting film and a preparation method thereof. A main method used comprises ultramicro-refining graphene oxide under high-pressure shearing, high-speed impacting and a strong cavitation action to reduce a flake diameter of the graphene oxide, thereby reducing a viscosity of the graphene oxide slurry and increasing a solid content of the graphene oxide
(Continued)

slurry, so that an efficiency of coating the graphene oxide slurry into the graphene oxide film is improved.

12 Claims, 8 Drawing Sheets

(58) Field of Classification Search
CPC ..... C01B 32/19; C01B 32/192; C01B 32/194; C01B 32/196; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; C01P 2004/61; C01P 2006/10
See application file for complete search history.

(56) References Cited

U.S. PATENT DOCUMENTS

| | | | |
|---|---|---|---|
| 2019/0031513 A1* | 1/2019 | Zhou | .......................... C09K 5/14 |
| 2020/0255293 A1* | 8/2020 | Ladislaus | .............. B32B 43/006 |

FOREIGN PATENT DOCUMENTS

| | | | | | |
|---|---|---|---|---|---|
| CN | 103449423 A | | 12/2013 | | |
| CN | 105819432 A | | 8/2016 | | |
| CN | 205683949 U | | 11/2016 | | |
| CN | 107857257 A | | 3/2018 | | |
| CN | 108047822 A | | 5/2018 | | |
| CN | 108203091 A | * | 6/2018 | ........... | C01B 32/192 |
| CN | 108203091 A | | 6/2018 | | |
| CN | 109467078 A | | 3/2019 | | |
| CN | 109650385 A | | 4/2019 | | |
| WO | WO 2017/064496 | * | 4/2017 | ............. | C01B 31/04 |

* cited by examiner

LOW-VISCOSITY GRAPHENE OXIDE SLURRY AND PREPARATION METHOD THEREOF, AND GRAPHENE OXIDE FILM AND PREPARATION METHOD THEREOF

TECHNICAL FIELD

The present invention relates to the field of graphene materials, and particularly relates to a process for improving a preparation efficiency for preparing a graphene heat-conducting film by a thermal reduction method.

BACKGROUND ART

Since its discovery in 2004, graphene has been widely studied and applied in sensing devices, optoelectronics and energy materials due to its super-large specific surface area, high electrical conductivity, excellent chemical and thermodynamic stability, and physical and mechanical properties.

In the prior art, a main method for preparing a graphene heat-conducting film with a good heat-conducting property is: firstly, a graphene oxide filter cake prepared by a Hummers method is dispersed into a slurry, a substrate is coated with the slurry and a graphene oxide film is prepared after drying, and then the graphene oxide film is subjected to high-temperature thermal reduction to obtain the graphene heat-conducting film.

However, due to a high viscosity of the graphene oxide slurry, its solid content can be up to 2.0-4.0%. Since the solid content is limited to a low level, an efficiency of graphene oxide slurry coating is low, greatly limiting large-scale production.

The content of the background art is merely technology known to the inventors and does not of course represent the prior art in this field.

SUMMARY OF THE INVENTION

In view of one or more problems in the prior art, the technical problem to be solved by the present invention is to improve an efficiency of graphene oxide slurry coating, and a main method used comprises ultramicro-refining graphene oxide by high-pressure shearing, high-speed impacting and a strong cavitation action to reduce a flake diameter of graphene oxide, and reduce a viscosity of a graphene oxide slurry, thereby increasing a solid content of the graphene oxide slurry, so that the efficiency of coating the graphene oxide slurry is improved.

The invention provides a low-viscosity graphene oxide slurry, and a solid content of the graphene oxide slurry is 5-10%, preferably 8%.

According to one aspect of the present invention, a viscosity of the graphene oxide slurry is 10000-50000 mPa·s, preferably 20000 mPa·s.

A too high viscosity and a too low viscosity are not conducive to coating; the viscosity higher than 50000 mPa·s is not conducive to casting of a graphene oxide slurry; when the viscosity is lower than 10000 mPa·s, fluidity of the graphene oxide slurry is too large, which is not conducive to control a coating thickness.

Preferably, the low-viscosity graphene oxide slurry are composed of graphene oxide micro-flakes, and an average flake diameter is 2-3 μm.

The present invention further provides a preparation method of a low-viscosity graphene oxide slurry, graphene oxide is mixed with a solvent, dispersed and ultramicro-refined to reduce an average flake diameter of the graphene oxide, so that the low-viscosity graphene oxide slurry is obtained.

The graphene oxide is rich in oxygen-containing functional group, "defects" are generated at an edge of a flake layer and in a middle of the flake layer due to the presence of functional groups during oxidation, these parts are easily broken under actions of a high-pressure viscosity reducing apparatus (cavitation effect, impacting effect, and shearing effect) due to the defects, so that the flake diameter of the graphene oxide can be reduced from 17-18 μm to 2-3 μm on average. Also, since the oxygen-containing functional group of the graphene oxide has a hydrophilic effect, it can be dispersed in water. Under an oxidation degree in a certain range, the smaller the flake diameter of the graphene oxide, the smaller a borne internal friction force, and accordingly, the viscosity is decreased macroscopically, so that a solid content of the graphene oxide slurry can be increased, thereby improving a coating efficiency of the graphene oxide slurry on a substrate.

According to one aspect of the present invention, the graphene oxide is prepared by a Hummers method.

Preferably, a molar ratio of oxygen to carbon in the graphene oxide is 0.6-0.7, preferably 0.65.

Preferably, the solvent is water.

Preferably, a linear velocity of the dispersing is 2-20 m/s, preferably 5 m/s.

Further preferably, time of the dispersing is 1-5 h, preferably 2 h.

During dispersing, the flake layer of the graphene oxide is opened in water and uniformly dispersed.

According to one aspect of the present invention, a method of ultramicro-refining comprises applying pressure to a mixture of the graphene oxide and the solvent, enabling the mixture to pass through a slit, subjecting the mixture to high-pressure shearing and high-speed impacting in a process of passing through the slit, and generating a strong cavitation action due to instantaneous release of pressure energy after passing through the slit.

Preferably, the pressure applied is 50-250 MPa, preferably 100 MPa;

Preferably, ultramicro-refining continues until an average flake diameter of the graphene oxide is 2-3 μm.

According to ultramicro-refining, when high pressure is used to make a liquid material flow through a narrow gap at a high speed, the strong cavitation action similar to an explosion effect is generated in a narrow region under the high pressure when the pressure energy is suddenly released, in addition, the liquid material is broken by a refining action generated by the liquid material passing through the slit and a high-speed impacting action generated by impacting in a cavity, so that a liquid substance or solid particles using liquid as a carrier are ultramicro-refined, and the graphene oxide micro flake is refined. Setting the pressure applied to the mixture of graphene oxide and the solvent by ultramicro-refining to be 50-250 MPa, the flake diameter of the graphene oxide can be refined from 17-18 μm to 2-3 μm on average; if the pressure is too small and less than 50 MPa, the refining action is insufficient; if the flake diameter of the graphene oxide cannot reach 2-3 μm, a viscosity reduction effect cannot be achieved; if the pressure is more than 250 MPa, a machine is prone to damage, and the higher a frequency of damage, the higher the manufacturing cost.

According to one aspect of the present invention, a viscosity of the graphene oxide slurry before ultramicro-refining is 100000-200000 mPa·s.

Preferably, the viscosity of the graphene oxide slurry after ultramicro-refining is 10000-50000 mPa·s, preferably 20000 mPa·s.

Further, a solid content of the graphene oxide slurry is 5-10%, preferably 8%.

The present invention further provides a graphene oxide film, and an average flake diameter of graphene oxide in the graphene oxide film is 2-3 μm.

According to one aspect of the present invention, a thickness of the graphene oxide film is 50-500 μm, preferably 200 μm.

Preferably, a density of the graphene oxide film is 1.0-2.0 g/cm$^3$.

The present invention further provides a preparation method of a graphene oxide film, a low-viscosity graphene oxide slurry is prepared by using the preparation method of the low-viscosity graphene oxide slurry, after defoaming treatment, a surface of the substrate is coated with the defoamed graphene oxide slurry, and by means of drying and stripping, the graphene oxide film is obtained.

The substrate is a dried carrier coated with the graphene oxide slurry, and after coating and drying the graphene oxide slurry, the graphene oxide film is formed on the surface of the substrate.

According to one aspect of the present invention, the defoaming is vacuum defoaming, and a vacuum value of the vacuum defoaming is −95 to −50 kPa, preferably −80 kPa.

Preferably, an on-line continuous defoaming machine is used for the defoaming.

According to one aspect of the present invention, a mode of knife coating or extrusion coating is used for coating, and a rate of the coating is 1-10 m/min, preferably 3 m/min.

Preferably, a thickness of the coating is 0.5-5.0 mm, preferably 1.5 mm.

According to one aspect of the present invention, a temperature of the drying is 70-130° C., preferably 100° C.

Preferably, time of the drying is 8-80 min, preferably 27-30 min;

Preferably, a thickness of the graphene oxide film is 50-500 μm, preferably 200 μm.

As a solid content of the graphene oxide slurry increases, the thickness of coating becomes smaller, the coating speed increases, and the coating efficiency per unit time increases. The time of drying is adjusted according to a length of a drying oven of a coating machine and the coating speed, and the time of drying is shortened due to the increase of the coating speed, which greatly improves a preparation efficiency of the graphene oxide film.

The present invention further provides a graphene heat-conducting film, a heat-conducting coefficient of the graphene heat-conducting film is 1000-1600 W/m·K, preferably 1500 W/m·K.

Preferably, a density of the graphene heat-conducting film is 1.5-2.2 g/cm$^3$, preferably 2.0 g/cm$^3$.

Preferably, a thickness of the graphene heat-conducting film is 10-150 μm, preferably 40 μm.

The present invention further provides a preparation method of a graphene heat-conducting film, a graphene oxide film is prepared by using the preparation method of the graphene oxide film, and by means of heat treatment and calendering, the graphene heat-conducting film is obtained.

Preferably, a temperature of the heat treatment is 1000-3000° C., preferably 2000° C.; Preferably, a density of the graphene oxide film after heat treatment is 0.1-1.0 g/cm$^3$, preferably 0.3 g/cm$^3$;

Further preferably, pressure of the calendering is 50-200 t, preferably 100 t.

The present invention has the beneficial effects.

The present invention reduces the flake diameter of the graphene oxide from 17-18 μm to 2-3 μm on average by refining the graphene oxide micro-flakes to reduce the viscosity of the graphene oxide slurry and increase the solid content of the slurry to 5-10%. Advantages of the present invention are illustrated below by the following points.

(1) Due to the increase of the solid content of the graphene oxide slurry, the thickness of coating becomes smaller, a coating rate increases, and then the coating efficiency is increased to above 300%, and unit productivity is greatly increased.

(2) Because the thickness of coating becomes smaller, drying can be carried out at a higher temperature without bubbling the graphene oxide film; in addition, a water content of the graphene oxide slurry becomes lower, so that it is easier for the graphene oxide film to remove water molecules, which shortens the time of drying and improves the efficiency of preparing the graphene oxide film.

(3) Due to the improved efficiency of preparing the graphene oxide film, the preparation cost is greatly reduced, which is suitable for industrial large-scale production.

(4) Compared with the prior art, the graphene heat-conducting film prepared by the present invention is normal in appearance, thickness, density, heat-conducting coefficient, cohesion, etc. during various performance tests.

BRIEF DESCRIPTION OF THE DRAWINGS

The drawings are used to provide a further understanding of the present invention and constitute a part of this description, are used to illustrate the present invention together with examples of the present invention, and do not constitute a limitation to the present invention. In the drawings.

DETAILED DESCRIPTION

Figure 1:
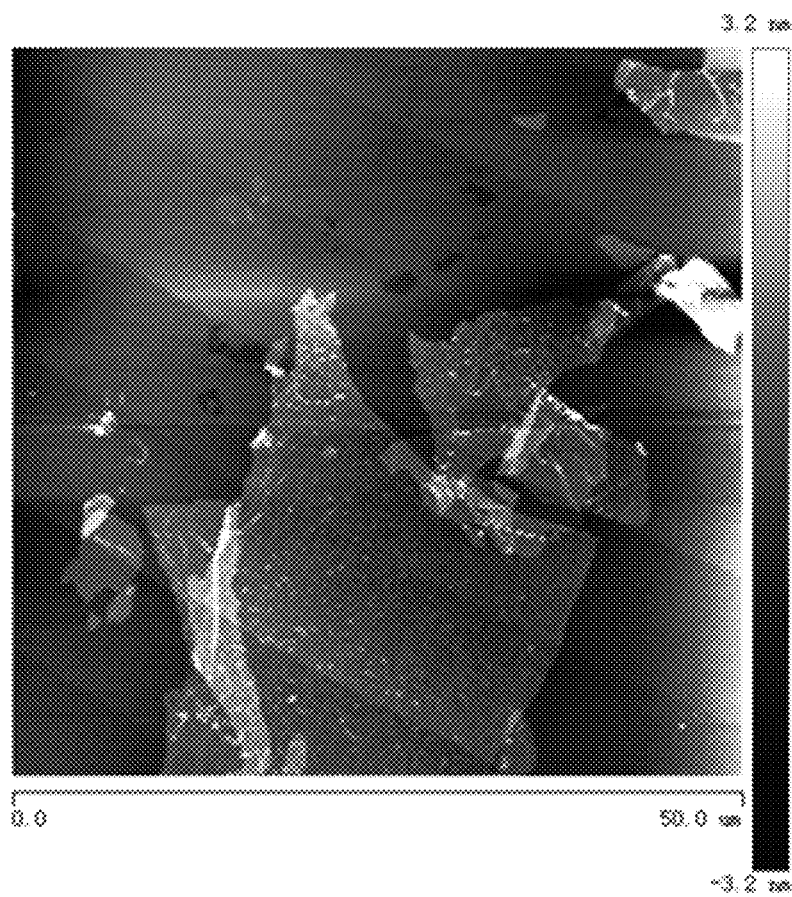
FIG. 1 is an AFM schematic diagram before flake diameter viscosity reduction of graphene oxide.

In the following, only certain exemplary examples are briefly described. As will be recognized by those skilled in the art, the described examples can be modified in various ways without departing from the spirit or scope of the present invention. Accordingly, the drawings and description are regarded as illustrative in nature, and not restrictive.

The preferred examples of the present invention will be described below with reference to the drawings, and it should be understood that the preferred examples described herein are only used to illustrate and explain the present invention and not used to limit the present invention.

As a first embodiment of the present invention, a low-viscosity graphene oxide slurry is shown, and a solid content of the graphene oxide slurry is 5-10%, for example: 5%, 5.5%, 6%, 6.5%, 7%, 7.5%, 8%, 8.5%, 9%, 9.5%, 10%, etc. As a preferred embodiment, the solid content of the graphene oxide slurry is 8%. A viscosity of the graphene oxide slurry is 10000-50000 mPa·s, for example: 10000 mPa·s, 11000 mPa·s, 12000 mPa·s, 15000 mPa·s, 20000 mPa·s, 22000 mPa·s, 23000 mPa·s, 25000 mPa·s, 30000 mPa·s, 32000 mPa·s, 35000 mPa·s, 40000 mPa·s, 42000 mPa·s, 45000 mPa·s, 48000 mPa·s, 50000 mPa·s, etc. As a preferred embodiment, the viscosity of the graphene oxide slurry is 20000 mPa·s. A too high viscosity and a too low viscosity are not conducive to coating; the viscosity higher than 50000 mPa·s is not conducive to that a graphene oxide slurry flows out; when the viscosity is lower than 10000 mPa·s, fluidity of the graphene oxide slurry is too large, which is not conducive to control a coating thickness. Graphene oxide is composed of graphene oxide micro-flakes, and an average flake diameter is 2-3 μm, for example: 2 μm, 2.1 μm, 2.2 μm, 2.3 μm, 2.4 μm, 2.5 μm, 2.6 μm, 2.7 μm, 2.8 μm, 2.9 μm, 3 μm, etc.

As a second embodiment of the present invention, a preparation method of a low-viscosity graphene oxide slurry is shown, graphene oxide is mixed with a solvent, dispersed and ultramicro-refined to reduce an average flake diameter of the graphene oxide, so that the low-viscosity graphene oxide slurry is obtained.

The graphene oxide is rich in oxygen-containing functional group, "defects" are generated at an edge of a flake layer and in a middle of the flake layer due to the presence of functional groups during oxidation, these parts are easily broken under actions of a high-pressure viscosity reducing apparatus (cavitation effect, and impacting effect) due to the defects, so that the flake diameter of the graphene oxide can be reduced from 17-18 μm to 2-3 μm on average. Also, since the oxygen-containing functional group of the graphene oxide has a hydrophilic effect, it can be dispersed in water. Under an oxidation degree in a certain range, the smaller the flake diameter of the graphene oxide, the smaller a borne internal friction force, and accordingly, the viscosity is decreased macroscopically, so that a solid content of the graphene oxide slurry can be increased, thereby improving a coating efficiency of the graphene oxide slurry on a substrate.

The graphene oxide is prepared by a Hummers method. A molar ratio of oxygen to carbon in the graphene oxide is 0.6-0.7, for example: 0.6, 0.61, 0.62, 0.63, 0.64, 0.65, 0.66, 0.67, 0.68, 0.69, etc. As a preferred embodiment, the molar ratio of oxygen to carbon in the graphene oxide is 0.65. The solvent is water. A linear velocity of dispersing is 2-20 m/s, for example: 2 m/s, 3 m/s, 4 m/s, 5 m/s, 6 m/s, 7 m/s, 8 m/s, 9 m/s, 10 m/s, 11 m/s, 12 m/s, 13 m/s, 14 m/s, 15 m/s, 16 m/s, 17 m/s, 18 m/s, 19 m/s, 20 m/s, etc. As a preferred embodiment, the linear velocity of dispersing is 5 m/s.

Figure 2:
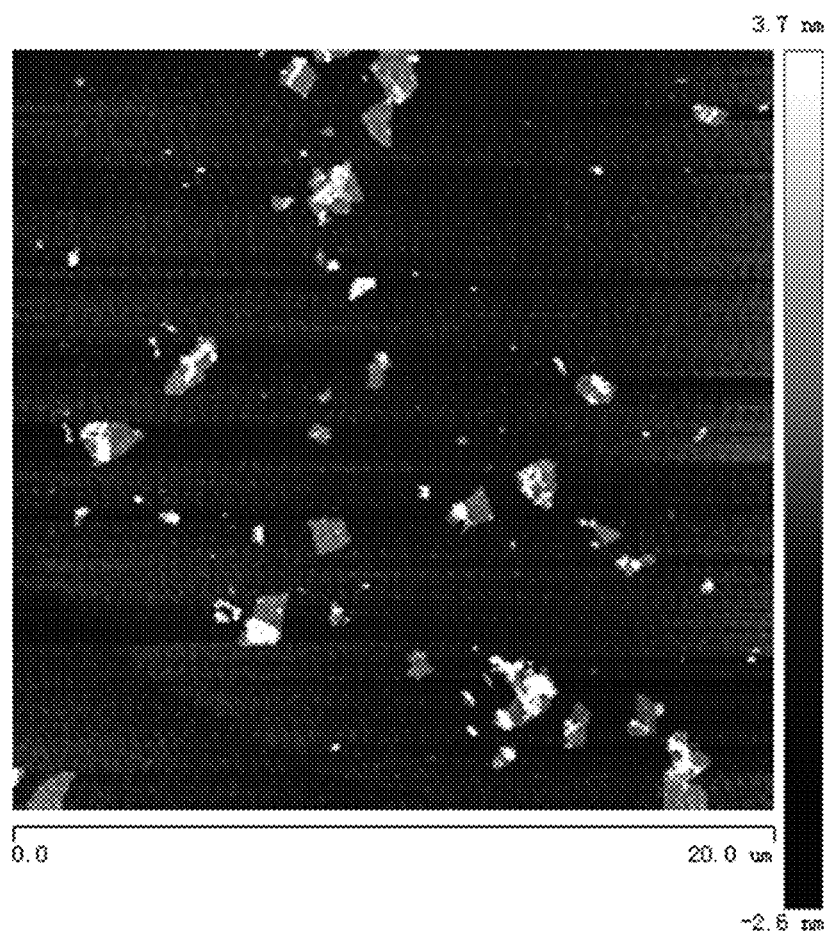
FIG. 2 is an AFM schematic diagram after flake diameter viscosity reduction of the graphene oxide.
Figure 3:
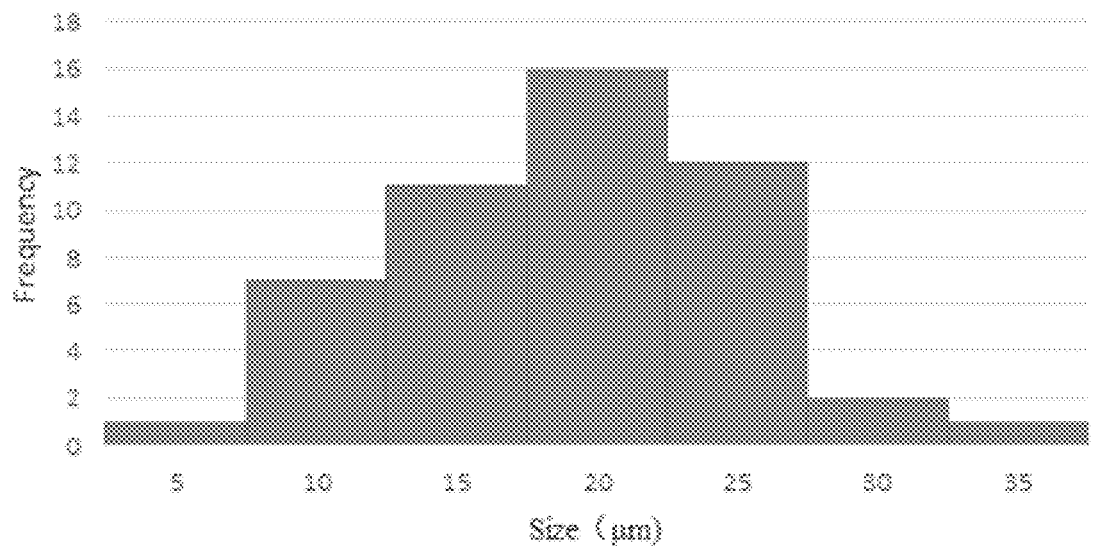
FIG. 3 is an AFM particle size distribution diagram before viscosity reduction of the graphene oxide, an abscissa representing a size (μm) of a flake diameter of the graphene oxide and an ordinate representing a frequency number (pieces)
Figure 4:
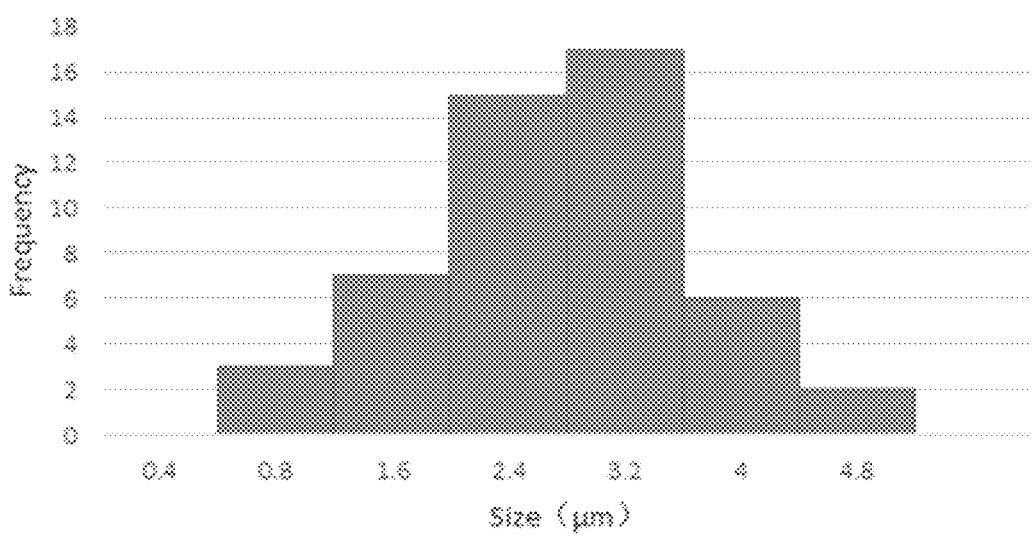
FIG. 4 is an AFM particle size distribution diagram after viscosity reduction of the graphene oxide, an abscissa representing a size (μm) of a flake diameter of the graphene oxide and an ordinate representing a frequency number (pieces)

Time of dispersing is 1-5 h, for example: 1 h, 1.2 h, 1.5 h, 1.8 h, 2 h, 2.2 h, 2.5 h, 2.8 h, 3 h, 3.2 h, 3.5 h, 3.8 h, 4 h, 4.2 h, 4.5 h, 4.8 h, 5 h, etc. As a preferred embodiment, the time of dispersing is 2 h. A method of ultramicro-refining comprises applying pressure to a mixture of the graphene oxide and the solvent, enabling the mixture to pass through a slit, subjecting the mixture to high-pressure shearing and high-speed impacting in a process of passing through the slit, and generating a strong cavitation action due to instantaneous release of pressure energy after passing through the slit. The pressure applied is 50-250 MPa, for example: 50 MPa, 51 MPa, 52 MPa, 53 MPa, 54 MPa, 55 MPa, 56 MPa, 57 MPa, 58 MPa, 59 MPa, 60 MPa, 70 MPa, 80 MPa, 90 MPa, 100 MPa, 110 MPa, 120 MPa, 130 MPa, 140 MPa, 150 MPa, 160 MPa, 170 MPa, 180 MPa, 190 MPa, 200 MPa, 210 MPa, 220 MPa, 230 MPa, 240 MPa, 245 MPa, 246 MPa, 247 MPa, 248 MPa, 249 MPa, 250 MPa, etc. As a preferred embodiment, the ultramicro-refining pressure is 100 MPa. Ultramicro-refining continues until an average flake diameter of the graphene oxide is 2-3 μm, for example: 2 μm, 2.1 μm, 2.2 μm, 2.3 μm, 2.4 μm, 2.5 μm, 2.6 μm, 2.7 μm, 2.8 μm, 2.9 μm, 3 μm, etc. It can be seen from FIG. 1 that the flake diameter of the graphene oxide is relatively large compared with a proportional scale of 50 μm, some graphene oxide can reach a flake diameter of 25 μm, and a bar scaleplate on a right side represents a height of the graphene oxide. It can be seen from FIG. 2 that the flake diameter of the graphene oxide is very small compared with a proportional scale of 20 μm, and basically smaller than 3 μm, and a bar scaleplate on a right side represents the height of the graphene oxide. As shown in FIG. 3 and FIG. 4, the flake diameter of the graphene oxide before viscosity reduction is concentrated in an interval of 15-25 μm, a mean value of the flake diameter is 18.236 μm, and a standard deviation is 1.012; the flake diameter of the graphene oxide after viscosity reduction is concentrated in an interval of 1.6-4 μm, a mean value of the flake diameter is is 2.495 μm, the standard deviation is 0.936, the flake diameter of the graphene oxide after viscosity reduction is is reduced, and distribution of the flake diameter is more average.

According to ultramicro-refining, when high pressure is used to make a liquid material flow through a narrow gap at a high speed, the strong cavitation action similar to an explosion effect is generated in a narrow region under the high pressure when the pressure energy is suddenly released, in addition, the liquid material is broken by a refining action generated by the liquid material passing through the slit and a high-speed impacting action generated by impacting in a cavity, so that a liquid substance or solid particles using liquid as a carrier are ultramicro-refined, and the graphene oxide micro flake is refined. Setting the pressure applied to the mixture of graphene oxide and the solvent by ultramicro-refining to be 50-250 MPa, the flake diameter of the graphene oxide can be refined from 17-18 μm to 2-3 μm on average; if the pressure is too small and less than 50 MPa, a refining effect is insufficient; if the flake diameter of the graphene oxide cannot reach 2-3 μm, a viscosity reduction effect cannot be achieved; if the pressure is more than 250 MPa, a machine is prone to damage, and the higher a frequency of damage, the higher the manufacturing cost.

The viscosity of the graphene oxide slurry before ultramicro-refining is 100000-200000 mPa·s, for example: 100000 mPa·s, 105000 mPa·s, 110000 mPa·s, 115000 mPa·s, 120000 mPa·s, 125000 mPa·s, 130000 mPa·s, 135000 mPa·s, 140000 mPa·s, 145000 mPa·s, 150000 mPa·s, 160000 mPa·s, 170000 mPa·s, 180000 mPa·s, 190000 mPa·s, 195000 mPa·s, 200000 mPa·s, etc. The viscosity of the graphene oxide slurry after ultramicro-refining is 10000-50000 mPa·s, for example: 10000 mPa·s, 11000 mPa·s, 12000 mPa·s, 15000 mPa·s, 20000 mPa·s, 22000 mPa·s, 23000 mPa·s, 25000 mPa·s, 30000 mPa·s, 32000 mPa·s, 35000 mPa·s, 40000 mPa·s, 42000 mPa·s, 45000 mPa·s, 48000 mPa·s, 50000 mPa·s, etc. As a preferred embodiment, the viscosity of the graphene oxide slurry after ultramicro-refining is 20000 mPa·s. A solid content of the graphene oxide slurry is 5-10%, for example: 5%, 5.1%, 5.2%, 5.3%, 5.4%, 5.5%, 6%, 6.5%, 7%, 7.5%, 8%, 8.5%, 9%, 9.5%, 9.6%, 9.7%, 9.8%, 9.9%, 10%, etc. As a preferred embodiment, the solid content of the graphene oxide slurry is 8%.

As a third embodiment of the present invention, a graphene oxide film is shown, and an average flake diameter of graphene oxide in the graphene oxide film is 2-3 μm, for example: 2 μm, 2.1 μm, 2.2 μm, 2.3 μm, 2.4 μm, 2.5 μm, 2.6 μm, 2.7 μm, 2.8 μm, 2.9 μm, 3 μm, etc. A thickness of the graphene oxide film is 100-500 μm, for example: 100 μm, 120 μm, 150 μm, 180 μm, 200 μm, 220 μm, 250 μm, 280 μm, 300 μm, 320 μm, 350 μm, 380 μm, 400 μm, 420 μm, 450 μm, 480 μm, 500 μm, etc. As a preferred embodiment, the thickness of the graphene oxide film is 200 μm. A density of the graphene oxide film is 1.0-2.0 g/cm$^3$, for example: 1.0 g/cm$^3$, 1.1 g/cm$^3$, 1.2 g/cm$^3$, 1.3 g/cm$^3$, 1.4 g/cm3, 1.5 g/cm$^3$, 1.6 g/cm$^3$, 1.7 g/cm$^3$, 1.8 g/cm$^3$, 1.9 g/cm$^3$, 2.0 g/cm$^3$, etc.

As a fourth embodiment of the present invention, a preparation method of a graphene oxide film is shown, a low-viscosity graphene oxide slurry is prepared by using the method in the second embodiment of the present invention, after defoaming treatment, a surface of a substrate is coated with the defoamed graphene oxide slurry, and by means of drying and stripping, the graphene oxide film is obtained.

The substrate is a dried carrier coated with the graphene oxide slurry, and after coating and drying the graphene oxide slurry, the graphene oxide film is formed on the surface of the substrate.

Defoaming is vacuum defoaming, and a vacuum value of vacuum defoaming is −95 to −50 kPa, for example: −95 kPa, −90 kPa, −85 kPa, −80 kPa, −75 kPa, −70 kPa, −65 kPa, −60 kPa, −55 kPa, −50 kPa, etc. As a preferred embodiment, the vacuum value of vacuum defoaming is −80 kPa. An on-line continuous defoaming machine is used for defoaming. A mode of knife coating or extrusion coating is used for coating, and a rate of the coating is 1-10 m/min, for example: 1 m/min, 1.1 m/min, 1.2 m/min, 1.3 m/min, 1.4 m/min, 1.5 m/min, 2 m/min, 2.5 m/min, 3 m/min, 3.5 m/min, 4 m/min, 4.5 m/min, 5 m/min, 5.5 m/min, 6 m/min, 6.5 m/min, 7 m/min, 7.5 m/min, 8 m/min, 8.5 m/min, 9 m/min, 9.5 m/min, 9.6 m/min, 9.7 m/min, 9.8 m/min, 9.9 m/min, 10 m/min, etc. As a preferred embodiment, the rate of coating is 3 m/min. A thickness of coating is 0.5-5.0 mm, for example: 0.5 mm, 0.52 mm, 0.55 mm, 0.58 mm, 0.6 mm, 0.62 mm, 0.65 mm, 0.68 mm, 0.7 mm, 0.75 mm, 0.76 mm, 0.77 mm, 0.78 mm, 0.79 mm, 0.8 mm, 0.9 mm, 1 mm, 1.2 mm, 1.3 mm, 1.5 mm, 1.6 mm, 1.8 mm, 2 mm, 2.1 mm, 2.2 mm, 2.5 mm, 2.6 mm, 2.7 mm, 2.8 mm, 2.9 mm, 2.93 mm, 2.95 mm, 2.97 mm, 2.98 mm, 2.99 mm, 3.0 mm, 3.5 mm, 4 mm, 4.2 mm, 4.5 mm, 4.8 mm, 5 mm, etc. As a preferred embodiment, the thickness of coating is 1.5 mm. As a solid content of the graphene oxide slurry increases, the thickness of coating becomes smaller, the coating speed increases, and the coating efficiency per unit time increases. A temperature of drying is 70-130° C., for example: 70° C., 71° C., 72° C., 73° C., 75° C., 78° C., 80° C., 82° C., 85° C., 88° C., 90° C., 92° C., 95° C., 98° C., 100° C., 102° C., 105° C., 108° C., 110° C., 112° C., 115° C., 118° C., 120° C., 122° C., 125° C., 126° C., 127° C., 128° C., 129° C., 130° C., etc. As a preferred embodiment, the temperature of drying is 100° C. Time of drying is 8-80 min, for example: 8 min, 9 min, 10 min, 12 min, 15 min, 16 min, 18 min, 20 min, 22 min, 24 min, 25 min, 27 min, 28 min, 29 min, 30 min, 32 min, 34 min, 35 min, 38 min, 40 min, 45 min, 50 min, 55 min, 60 min, 65 min, 70 min, 75 min, 78 min, 80 min, etc. As a preferred embodiment, time of drying is 27-30 min, for example: 27 min, 28 min, 29 min, 30 min, etc. A thickness of the graphene oxide film is 50-500 μm, for example: 50 μm, 60 μm, 70 μm, 80 μm, 90 μm, 100 μm, 120 μm, 150 μm, 180 μm, 200 μm, 220 μm, 250 μm, 280 μm, 300 μm, 320 μm, 350 μm, 380 μm, 400 μm, 420 μm, 450 μm, 480 μm, 490 μm, 500 μm, etc. As a preferred embodiment, the thickness of the graphene oxide film is 200 μm.

As a fifth embodiment of the present invention, a graphene heat-conducting film is shown, a heat-conducting coefficient of the graphene heat-conducting film is 1000-1600 W/m·K, for example: 1000 W/m·K, 1100 W/m·K, 1200 W/m·K, 1300 W/m·K, 1400 W/m·K, 1500 W/m·K, 1600 W/m·K, etc. As a preferred embodiment, the heat-conducting coefficient of the graphene heat-conducting film is 1500 W/m·K. A density of the graphene heat-conducting film is 1.5-2.2 g/cm$^3$, for example: 1.5 g/cm$^3$, 1.6 g/cm$^3$, 1.7 g/cm$^3$, 1.8 g/cm$^3$, 1.9 g/cm$^3$, 2.0 g/m$^3$, 2.1 g/cm$^3$, 2.2 g/cm$^3$, etc. As a preferred embodiment, the density of the graphene heat-conducting film is 2.0 g/m$^3$. A thickness of the graphene heat-conducting film is 10-150 μm, for example: 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, etc. As a preferred embodiment, the thickness of the graphene heat-conducting film is 40 μm.

Figure 5:
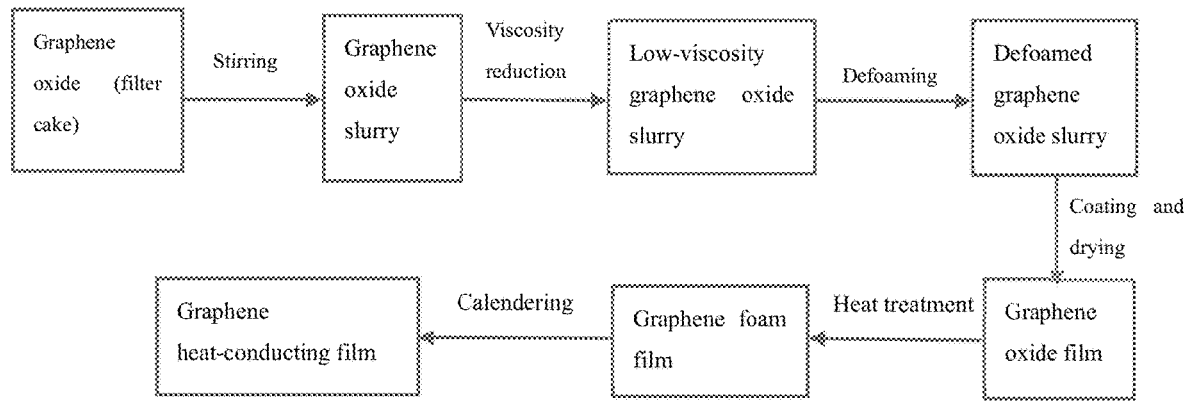
FIG. 5 is a step diagram of a sixth embodiment of the present invention.

As a sixth embodiment of the present invention, a preparation method of a graphene heat-conducting film is shown, a graphene oxide film is prepared by using the method in the fourth embodiment of the present invention, and by means of heat treatment and calendering, the graphene heat-conducting film is obtained. A specific preparation process is as shown in FIG. 5, a graphene oxide filter cake prepared by a Hummers method is first mixed with a solvent, stirred and dispersed, and a graphene oxide slurry is obtained; then the graphene oxide slurry is ultramicro-refined for viscosity reduction to obtain a low-viscosity graphene oxide slurry; then the low-viscosity graphene oxide slurry is defoamed, a substrate is coated with the defoamed graphene oxide slurry, and by means of drying and stripping, a graphene oxide film is obtained; then heat treatment is performed on the graphene oxide film to obtain the graphene foam film; finally, the graphene foam film is calendered to obtain a graphene heat-conducting film. A solid content of the graphene oxide slurry is 5-10%, which improves the coating efficiency. The appearance, density, heat-conducting coefficient, cohesion, tensile strength, etc. of the graphene heat-conducting film are comparable to those of a graphene heat-conducting film prepared from a graphene oxide slurry with a solid content of 2-4% prepared without viscosity reduction treatment, but the preparation efficiency is higher.

A temperature of heat treatment is 1000-3000° C., for example: 1000° C., 1100° C., 1200° C., 1300° C., 1400° C., 1500° C., 1600° C., 1700° C., 1800° C., 1900° C., 2000° C., 2100° C., 2200° C., 2300° C., 2400° C., 2500° C., 2600° C., 2700° C., 2800° C., 2900° C., 3000° C., etc. As a preferred embodiment, the temperature of thermal treatment is 2000° C. A density of the graphene oxide film after heat treatment is 0.1-1.0 g/cm$^3$, for example: 0.1 g/cm$^3$, 0.2 g/cm$^3$, 0.3 g/cm$^3$, 0.4 g/cm$^3$, 0.5 g/cm$^3$, 0.6 g/cm$^3$, 0.7 g/cm$^3$, 0.8 g/cm$^3$, 0.9 g/cm$^3$, 1.0 g/cm$^3$, etc. As a preferred embodiment, the density of the graphene oxide film after heat treatment is 0.3 g/cm$^3$. Pressure of calendering is 50-200 t, for example: 50 t, 60 t, 70 t, 80 t, 90 t, 100 t, 110 t, 120 t, 130 t, 140 t, 150 t, 160 t, 170 t, 180 t, 190 t, 200 t, etc. As a preferred embodiment, the pressure of calendering is 100 t.

The advantages of the present invention are further illustrated below through examples and comparative examples.

Example 1

Step (1): dispersing a graphene oxide filter cake with a solid content of 5.0% in deionized water by using a dispersing apparatus, a linear velocity of dispersing being 5 m/s, and a viscosity of a graphene oxide slurry obtained after dispersing for 2 h being 100000 mPa·s.

Step (2): ultramicro-refining the graphene oxide slurry, pressure being 50 MPa, and a viscosity of an obtained low-viscosity graphene oxide slurry being 20000 mPa·s.

Step (3): performing vacuum defoaming on the low-viscosity graphene oxide slurry in step (2) by using a defoaming apparatus, a vacuum value being −80 kPa.

Step (4): coating a PET thin film with the defoamed slurry in step (3) in a mode of knife coating, and after drying at 80° C. for 75 min, obtaining a graphene oxide film to be directly stripped and wound, a thickness of coating being 2.5 mm, and a coating speed being 1.2 m/min.

Figure 6:
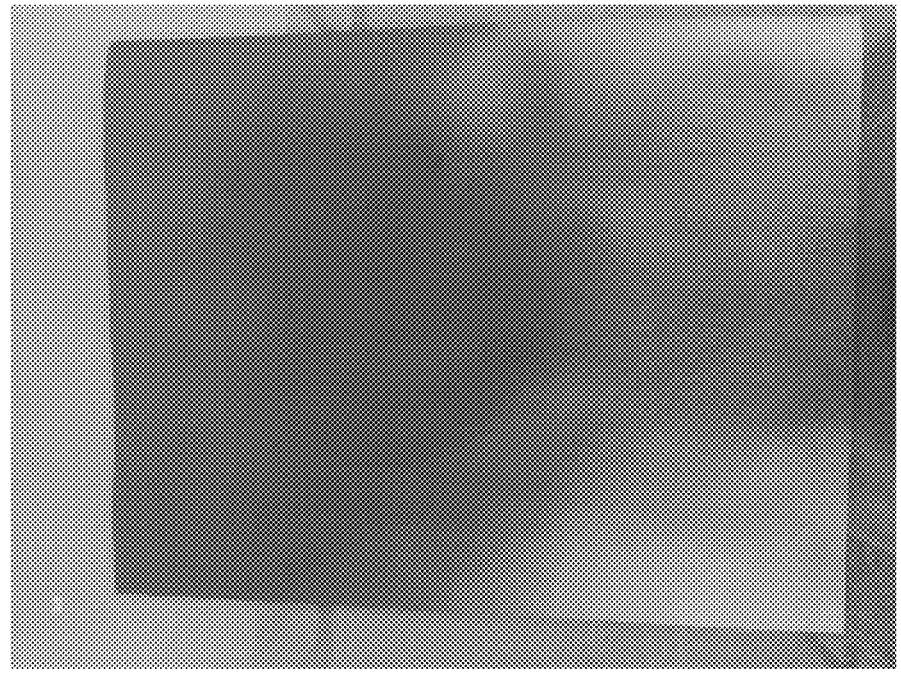
FIG. 6 is a physical diagram of a graphene oxide film of Example 1.

Step (5): slitting a graphene oxide film coiled material obtained by winding in step (4), as shown in FIG. 6, to obtain a graphene oxide film with a size of 300 mm*300 mm.

Step (6): performing high-temperature heat treatment on the graphene oxide film obtained in step (5) at 2000° C. to obtain a graphene foam film with a density of 0.3 g/cm$^3$.

Figure 7:
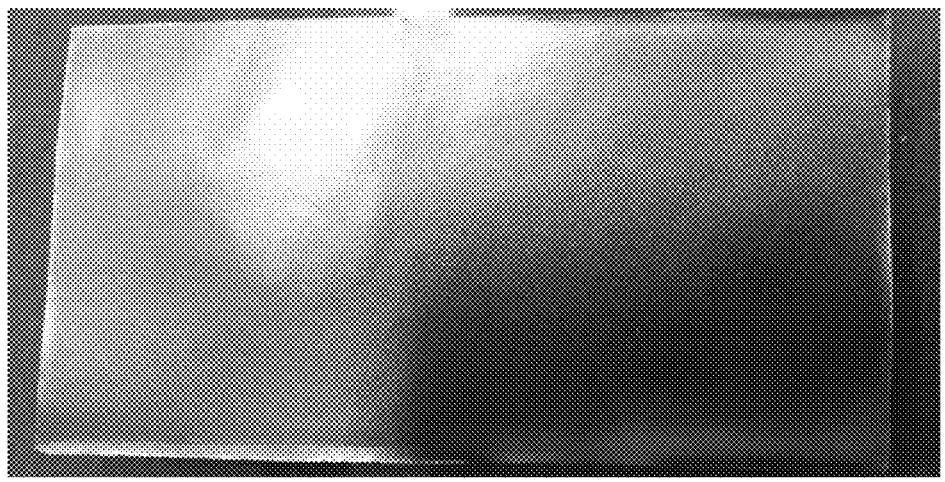
FIG. 7 is a physical diagram of a graphene heat-conducting film of Example 1.

Step (7): calendering the graphene foam film in step (6) using pressure of 100 t, as shown in FIG. 7, to obtain a graphene heat-conducting film having a density of 2.0 g/cm$^3$, a thickness of 40 μm, and a heat-conducting coefficient of 1500 W/m·K.

Example 2

Step (1): dispersing a graphene oxide filter cake with a solid content of 10.0% in deionized water by using a dispersing apparatus, a linear velocity of dispersing being 5 m/s, and a viscosity of a graphene oxide slurry obtained after dispersing for 2 h being 200000 mPa·s.

Step (2): ultramicro-refining the graphene oxide slurry, pressure being 100 MPa, a viscosity of an obtained low-viscosity graphene oxide slurry being 20000 mPa·s.

Step (3): performing vacuum defoaming on the low-viscosity graphene oxide slurry in step (2) by using a defoaming apparatus, a vacuum value being −80 kPa.

Step (4): coating a PET thin film with the defoamed slurry in step (3) in a mode of knife coating, and after drying at 120° C. for 11 min, obtaining a graphene oxide film to be directly stripped and wound, a thickness of coating being 0.75 mm, and a coating speed being 8.0 m/min.

Figure 8:
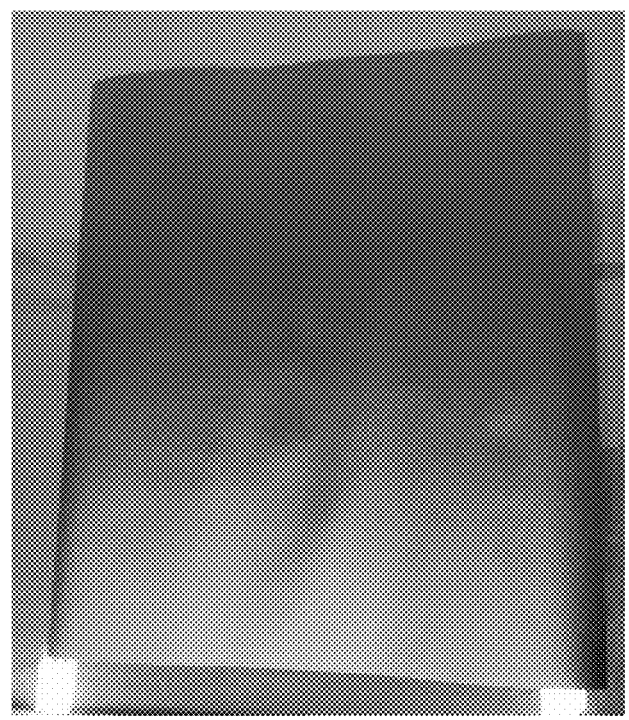
FIG. 8 is a physical diagram of a graphene oxide film of Example 2.

Step (5): slitting a graphene oxide film coiled material obtained by winding in step (4), as shown in FIG. 8, to obtain a graphene oxide film with a size of 300 mm*300 mm.

Step (6): performing high-temperature heat treatment on the graphene oxide film obtained in step (5) at 2000° C. to obtain a graphene foam film with a density of 0.3 g/cm$^3$.

Step (7): calendering the graphene foam film in step (6) using pressure of 100 t to obtain a graphene heat-conducting film having a density of 2.0 g/cm$^3$, a thickness of 20 μm, and a heat-conducting coefficient of 1500 W/m·K.

Example 3

Step (1): dispersing a graphene oxide filter cake with a solid content of 8.0% in deionized water by using a dispersing apparatus, a linear velocity of dispersing being 5 m/s, and a viscosity of a graphene oxide slurry obtained after dispersing for 2 h being 150000 mPa·s.

Step (2): ultramicro-refining the graphene oxide slurry, pressure being 100 MPa, a viscosity of an obtained low-viscosity graphene oxide slurry being 20000 mPa·s.

Step (3): performing vacuum defoaming on the low-viscosity graphene oxide slurry in step (2) by using a defoaming apparatus, a vacuum value being −80 kPa.

Step (4): coating a PET thin film with the defoamed slurry in step (3) in a mode of knife coating, and after drying at 100° C. for 30 min, obtaining a graphene oxide film to be directly stripped and wound, a thickness of coating being 1.5 mm, and a coating speed being 3 m/min.

Figure 9:
FIG. 9 is a physical diagram of a graphene oxide film of Example 3.

Step (5): slitting a graphene oxide film coiled material obtained by winding in step (4), as shown in FIG. 9, to obtain a graphene oxide film with a size of 300 mm*300 mm.

Step (6): performing high-temperature heat treatment on the graphene oxide film obtained in step (5) at 2000° C. to obtain a graphene foam film with a density of 0.3 g/cm$^3$.

Step (7): calendering the graphene foam film in step (6) using pressure of 100 t to obtain a graphene heat-conducting film having a density of 2.0 g/cm$^3$, a thickness of 40 μm, and a heat-conducting coefficient of 1500 W/m·K.

Comparative Example 4

Step (1): dispersing a graphene oxide filter cake with a solid content of 2.0% in deionized water by using a dispersing apparatus, a linear velocity of dispersing being 2 m/s, and a viscosity of a graphene oxide slurry obtained after dispersing for 2 h being 20000 mPa·s.

Step (2): performing vacuum defoaming on the graphene oxide slurry in step (1) by using a defoaming apparatus, a vacuum value being −80 kPa.

Step (3): coating a PET thin film with the defoamed slurry in step (2) in a mode of knife coating, and after drying at 70° C. for 5 h, obtaining a graphene oxide film to be directly stripped and wound, a thickness of coating being 6.0 mm, and a coating speed being 0.3 m/min.

Step (4): slitting a graphene oxide film coiled material obtained by winding in step (3) to obtain a graphene oxide film with a size of 300 mm*300 mm.

Step (5): performing high-temperature heat treatment on the graphene oxide film obtained in step (4) at 2000° C. to obtain a graphene foam film with a density of 0.3 g/cm$^3$.

Step (6): calendering the graphene foam film in step (5) using pressure of 100 t to obtain a graphene heat-conducting film having a density of 2.0 g/cm$^3$, a thickness of 40 μm, and a heat-conducting coefficient of 1500 W/m·K.

Comparative Example 5

Step (1): dispersing a graphene oxide filter cake with a solid content of 8.0% in deionized water by using a dispersing apparatus, a linear velocity of dispersing being 5 m/s, and a viscosity of a graphene oxide slurry obtained after dispersing for 2 h being 150000 mPa·s.

Step (2): performing vacuum defoaming on the graphene oxide slurry in step (1) by using a defoaming apparatus, under an existing defoaming technology, bubbles in the slurry being cannot be completely removed.

Figure 10:
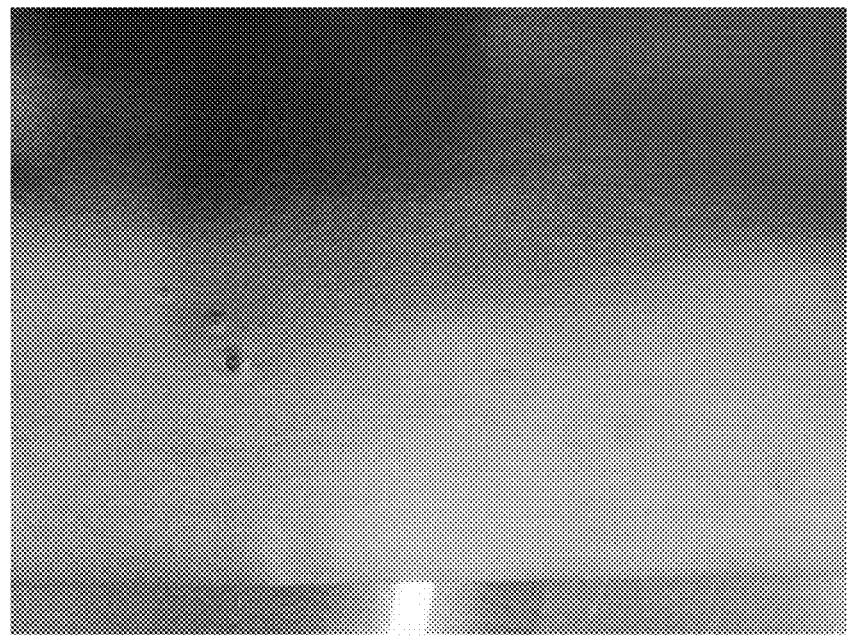
FIG. 10 is a physical diagram of a graphene oxide film of Comparative Example 5.

Step (3): coating a PET thin film with the defoamed slurry in step (2) in a mode of knife coating, and after drying at 100° C., obtaining a graphene oxide film to be directly stripped and wound, a thickness of coating being 1.5 mm, a coating speed being 3 m/min, and as shown in FIG. 10, the dried graphene oxide film having defects in appearance.

Step (4): slitting a graphene oxide film coiled material obtained by winding in step (3) to obtain a graphene oxide film with a size of 300 mm*300 mm.

Step (5): performing high-temperature heat treatment on the graphene oxide film obtained in step (4) at 2000° C. to obtain a graphene foam film with a density of 0.3 g/cm$^3$.

Figure 11:
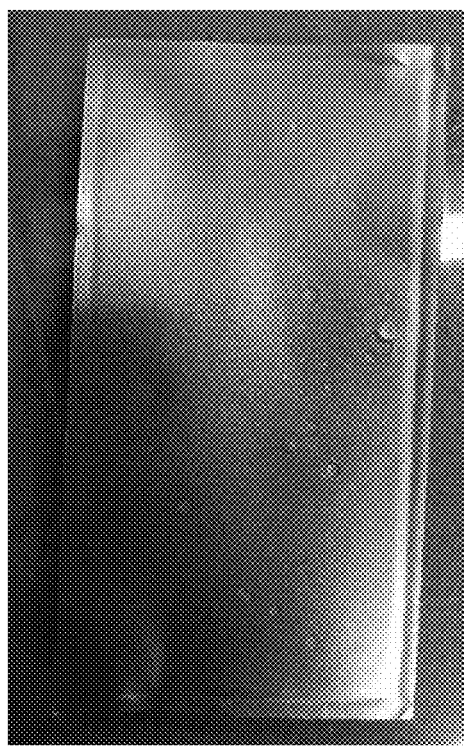
FIG. 11 is a physical diagram of a graphene heat-conducting film of Comparative Example 5.

Step (6): calendering the graphene foam film in step (5) using pressure of 100 t to obtain a graphene heat-conducting film having a density of 2.0 g/cm$^3$, a thickness of 40 μm, and a heat-conducting coefficient of 900 W/m·K, and as shown in FIG. 11, the heat-conducting film having defects in appearance.

Without ultramicron-refining of the present invention, the graphene oxide slurry of Comparative Example 5 with the solid content of 8% has a viscosity that is too high, which results in the following consequences.

(1) Under the existing defoaming technology, the bubbles in the graphene oxide slurry cannot be completely removed, and the bubbles may affect the appearance of the dried graphene oxide film, thereby resulting in defects of the graphene oxide film; severely, it is also possible that pipeline transportation cannot be completed due to poor fluidity of the graphene oxide slurry.

(2) Under the existing coating technology, the high viscosity would make the coating thickness nonuniform and the coating appearance uneven, which affects the thickness uniformity and appearance of the dried graphene oxide film after coating, and further affects the thickness uniformity and appearance of the graphene heat-conducting film, as shown in FIG. 11; severely, due to poor fluidity of the graphene oxide slurry, it may cause clogging in a pipeline during coating of the graphene oxide slurry.

(3) Since the viscosity of the slurry obtained after dispersion is too high, graphene oxide cannot be uniformly dispersed in water and cannot be sufficiently opened between the flake layers, thereby affecting the heat-conducting property of the final heat-conducting film, and the heat-conducting coefficient of the graphene heat-conducting film with a thickness of 40 μm is only 900 W/m·K.

As can be seen from Examples 1-3, by using the ultramicro-refining method of the present invention, it is possible to reduce the viscosity of the graphene oxide slurry and increase the solid content, thereby achieving the effects.

(1) Also for the graphene oxide slurry with the viscosity of 20000 mPa·s, Comparative Example 4 can only reach the solid content of 2%, but Examples 1-3 of the present invention can reach the solid content of 5-10%. The graphene oxide slurry of Examples 1-3 of the present invention has a high solid content and can achieve the effect of the same heat-conducting property as that of the graphene heat-conducting film obtained by coating to a thickness of 6 mm in Comparative Example 4 just by coating to a thickness of 0.75-2.5 mm.

Figure 12:
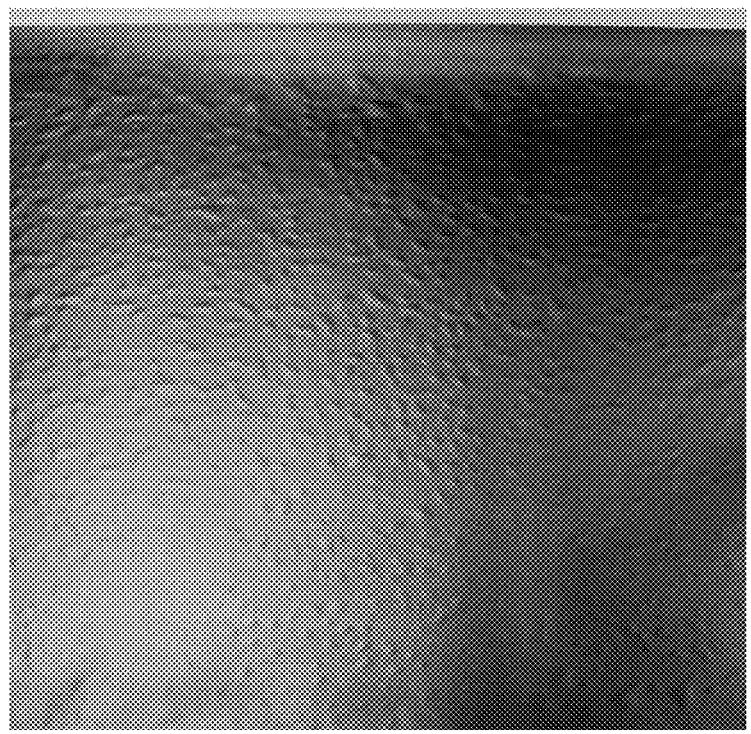
FIG. 12 is a physical diagram of a graphene oxide film when a graphene oxide film with a thickness of 6.0 mm produces bubbles when dried at 100° C.

(2) Due to the high solid content of Examples 1-3, the coating thickness becomes smaller and the coating speed increases, and the coating speed can reach 1.2 to 8 m/min, which results in an improve coating efficiency. Since the solid content of the graphene oxide in Comparative Example 4 is low, only by coating to a thickness of 6.0 mm, can a better heat-conducting effect be achieved, and at this thickness, if the drying temperature is too high and reaches 100° C., it is difficult for water molecules in the graphene oxide to escape, which may cause formation of cavities between layers of the graphene oxide film, and result in formation of a graphene oxide film as shown in FIG. 12; therefore, in order to ensure the appearance of the graphene oxide film, the drying temperature can only be reduced to 70° C. However, since the drying temperature is low and the thickness is large, only by reducing the coating rate and setting the coating rate to 0.3 m/min, can sufficient drying of the graphene oxide film be ensured.

Finally, it should be noted that: what is described above is only preferred examples of the present invention, and is not used to limit the present invention, although the present invention has been described in detail with reference to the foregoing examples, those skilled in the art can still modify the technical solution described by each of the foregoing examples or perform equivalent replacement on part of technical characteristics therein. Any modification, equivalent replacement, improvement, etc. made within the spirit and principle of the present invention shall be included within the protection scope of the present invention.

The invention claimed is:

1. A preparation method of a graphene oxide slurry, comprising:
dispersing graphene oxide in a solvent to form a mixture containing graphene oxide flakes having an average diameter of 17-18 μm;
pressurizing the mixture to 50-250 MPa;
passing the pressurized mixture through a slit so that the mixture is subject to high-pressure shearing and high-speed impacting when passing through the slit and a cavitation action due to instantaneous release of pressure energy after passing through the slit to reduce the average size of the graphene oxide flakes and to form a graphene oxide slurry containing ultramicro-refined graphene oxide flakes having an average diameter of 2-3 μm,
wherein the graphene oxide slurry has a viscosity of 10000-50000 mPa·s, and
wherein a solid content of the graphene oxide slurry is 5-10%.

2. The preparation method according to claim 1, wherein the graphene oxide flakes are prepared by a Hummers method.

3. The preparation method according to claim 1, wherein a molar ratio of oxygen to carbon in the graphene oxide is 0.6-0.7.

4. The preparation method according to claim 1, wherein the solvent is water.

5. The preparation method according to claim 1, wherein a linear velocity of the dispersing is 2-20 m/s.

6. The preparation method according to claim 5, wherein the linear velocity of the dispersing is 5 m/s.

7. The preparation method according to claim 1, wherein a time of the dispersing is 1-5 m/s.

8. The preparation method according to claim 1, wherein the mixture is pressurized to 100 MPa.

9. The preparation method according to claim 1, wherein a viscosity of the mixture is 100000-200000 mPa·s.

10. The preparation method according to claim 1, wherein the viscosity of the graphene oxide slurry is 20000 mPa·s.

11. The preparation method according to claim 1, wherein the solid content of the graphene oxide slurry is 8%.

12. A preparation method of a graphene heat-conducting film, comprising:
subjecting the graphene oxide slurry prepared by the method of claim 1 to a defoaming treatment;

coating the defoamed graphene oxide slurry on a substrate;
drying the defoamed graphene oxide slurry coated on the substrate to form a graphene oxide film;
stripping the graphene oxide film from the substrate;
heat-treating the graphene oxide film; and
calendaring the heat-treated graphene oxide film to form the graphene heat-conducting film.

* * * * *